Figure 1:
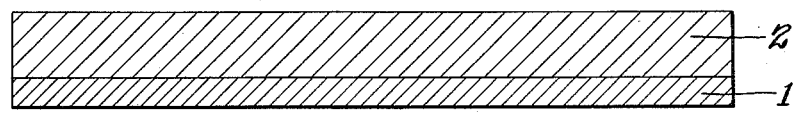

Nov. 24, 1936.  C. SCOTT  2,061,678

COMPOSITE FILM AND PICTURE AND METHOD OF PRODUCING THEM

Filed Nov. 8, 1935

INVENTOR

Clyde Scott

Patented Nov. 24, 1936

2,061,678

UNITED STATES PATENT OFFICE 2,061,678

COMPOSITE FILM AND PICTURE AND METHOD OF PRODUCING THEM

Clyde Scott, East Orange, N. J.

Application November 8, 1935, Serial No. 48,869

13 Claims. (Cl. 154—40)

This invention is a continuation in part of my co-pending application, Serial Number 618,813, filed June 22, 1932 for "Composite film and pictures and methods of producing them".

This invention seeks to render available, as a new article of manufacture, a composite film which is transparent, translucent or transpicious to light, which is impervious to and insoluble in water as to all of its constituent parts, which, under normal conditions, is non-tacky and can be easily handled in sheets or rolls and stored indefinitely without deterioration, but which, by the mere application of heat and pressure, can be caused to adhere tenaciously and with complete uniformity to any desired base such as paper, fabrics, wood, metal or the like to protect, ornament or finish one or both sides, or portions, thereof. The composite film may be applied to the contacting material, irrespective of the nature of the same, either in sheet form or from a roll in continuous lengths and in continuous operation, and without the employment of coating or pasting machines, drying ovens, solvent moistening or solvent evaporating equipment and without the use of film manufacturing machinery or semi-film-manufacturing processes, it being only necessary to contact the film and object thereto, and while in such contact, apply heat and pressure of suitable degree and length of time, the time factor being so relatively short as to be herein expressed as "momentarily". In contradistinction, the laminating or bonding processes heretofore proposed are substantially but film-forming processes, or cementing processes.

The film involved in this invention may be applied or welded upon any surface under all normal atmospheric conditions without special preparation of the film and without special machinery or skilled labor, diametrically opposite to those processes known in the art, wherein the work is required to be done under expert supervision and the employment of special machinery.

This invention further contemplates, as a new article of manufacture closely simulating a true photograph, a mechanical print faced with a film of cellulose acetate by means of a continuous skin forming an invisible bond of an exceedingly intimate and permanent nature to develop a pronounced depth of tone and to render more vivid the normal color value of the printed ink. This invention also has in objective a new method of making the aforesaid film and a new method of manufacturing simulated photographs.

To enable those skilled in the art to put either or all of these objectives into effect, a detailed explanation of one typical application of each will now be given.

The composite film is made by producing, on a conventional film of cellulose acetate or its equivalent, a non-tacky skin characterized by an ability to fuse, to blend as if melted, to flow freely under a heat and pressure lower than that which would effect the cellulose acetate. As a base constituent for such a skin, I propose a thermo-plastic synthetic resin. The physical properties of the resin or resinous substance employed are predominant. It is important that the resin shall have the property of becoming adhesive or tacky when subjected to the momentary influence of heat without the aid of volatile solvents or liquid flux and shall be capable of cooling to a flexible adherent compact mass after having been molten or fused. It should have no tendency to appreciable or observable chemical change or more than momentary physical change during fusion. Other properties a satisfactory thermo-plastic synthetic resin or its equivalent must possess to favor this invention, such as, for example, solubility, hardness, adhesive characteristics, etc., will become apparent to those skilled in the art from the following detailed description. Such a resin is polymerized vinyl acetate. The synthetic non-tacky skin is made preferably of polymerized vinyl acetate or chloride, a synthetic material readily available at the present time. This material is dissolved in a solvent which, while compatible for the synthetic resin, will not affect the cellulose acetate at normal pressures and temperatures. Such a solvent is toluol in which the synthetic resin may readily be dissolved, preferably to the extent of forming a solution containing about 20% of the resin. This solution is then filtered to clear it from any possible sediment and there results a free flowing water white liquor. "Sediment" or insoluble or partly dissolved or gelatinized particles are prone to occur in addition to specks of dirt, detritus and other insoluble matter, and it is essential that such sediment be substantially entirely removed especially when the film or film and contacting surfaces is afterwards subjected to close scrutiny or magnification when the opaque, translucent or opalescent particles cause unsightly blemishes after welding, they often result in discontinuous film having craters and such blemishes are heightened by magnification processes.

This liquor is then appropriately applied to a sheet of cellulose acetate; the manner of application being optional, as by spraying, roll-coating, brushing or dipping. The amount applied will, of course, be governed by the ultimate usage to which the film will be put; the object being to obtain a solid continuous skin of sufficient and no greater thickness than need be. For average purposes, the objective will be about .001 of an inch. It is important that the skin be thick enough to form a solid unbroken continuous surface which will not crack, chip, peel or otherwise separate from the film before or after welding so that the skin may form a solid lamina between the film and contacting surfaces after welding regardless of the character or nature of the surface of the contacting material. The solvent is evaporated from the liquid coating, spontaneously if desired, but preferably, for the sake of expedition, by exposure to a moderate heat having a temperature below the melting point of both the resin and the sheet.

The resulting product will be a thin sheet or film of cellulose acetate having an invisible thin layer or skin of fusible thermo-plastic polymerized resin. It is important to note that this skin is not the least tacky and, in fact, resembles in appearance and feel the cellulose acetate itself. It is not affected by water or dampness and may be stored for future handling either in the form of rolls or stacks. As an article of manufacture it lends itself to many uses by reason of its capacity for being caused to adhere tenaciously and permanently to any given base; merely by the application of sufficient heat and pressure to fuse the skin. To "fuse" as herein applied, is intended to convey that the state of softness, sintering, blending as if melted, incipient melting whereby blending is greatly facilitated and considerably augmented. This heat-sensitive and pressure-sensitive composite non-tacky film may be made in ribbon, tape or other form and may be used as an adhesive tape or otherwise, and without special manipulation involving chemical change, the employment of solvent, solvent combinations, sizes, drying or chilling operations, and may be welded in continuous operation directly from a roll or web between heated rollers, by means of platen presses or otherwise, a distinct and fundamental advance in the art.

With this material in hand, it becomes possible to achieve the further important objects of my invention; to wit, the simulated photograph and its method of production. Through various well known photo-mechanical printing methods, attractive pictures are being produced at the present time. While these represent the best work now commercially possible, as a substitute for true photographs, they are easily distinguishable from originals. But, by starting with these inexpensive prints, and subjecting them to the treatment herein described, they can, with but little expense, be brought into closer resemblance to a true photograph; so closely, in fact, as to serve many purposes which are still being filled by photographs. To do this, is only necessary to establish contact between the face of the printed picture and the coated face of my composite film, and, through the application of heat and pressure, to bring about a uniform adhesion. The character of this adhesion, by reason of the thermoplastic characteristics of the polymerized resin, materially differs from adhesion as ordinarily produced. In this case, the adhesion exhibits the characteristics of a transparent weld; being exceedingly intimate and producing almost unitary articles. While the amount of pressure is subject to variation, my experiments have indicated that, to produce the best results, it should be at about 250 lbs. pressure per square inch; the temperature being between the melting point of the two constituent materials of my composite film. The pressure, of course, may be produced by platens, or continuously between rollers in which latter case the heating contact is, of course, momentary and instantaneous. This results in establishing an effective bond or weld between the film and the nearer surface of a sheet of paper, fabric or the like, upon which the print appears. When bonding takes place in this manner, there is no observable alteration or chemical change in either the film or the synthetic skin. They are inseparable from the paper by physical, chemical or mechanical means short of actual destruction. The product is thus an integral one and when the paper fiber is removed the printing remains on the coated surface or skin of the film. A peculiarity important for the attainment of the highest quality of appearance is that the heat should be applied through the back of the printed picture, and preferably by heating the platen or roller which supports the picture; it being unnecessary to heat the platen or roller which applies the counterpressure to the composite film. When the heat is thus supplied from the direction of the print it can be controlled to render the skin resin plastic to the desired extent and with the minimum risk of detriment to the cellulose acetate film or making the latter itself plastic. This process lends itself readily to a wide variety of printed material, i. e., either fine or coarse grained, paper, cloth, metal-foil, etc. Either or both sides may be finished, water and fire-proofed and stiffened or reinforced by employing my film in suitable thicknesses; or to accentuate outstanding features of the picture, it may be applied only to such parts thereof. For coarse-grained textures, it is desirable to use a film having a somewhat thicker skin of adhesive, than for ordinary prints.

While this process is applicable to practically all types of printed matter, it is requisite to the beauty of the result that ink of good quality should be used. It should not smear, (or bleed) nor spread at the edges, nor tinge the paper, and it should be permanent in color and appearance. All of the constituent parts of the composite film and the paper exert a mutual action upon the ink. The distinctive result of the reaction is to make the ink more vivid, giving it greater color value, greater and more pronounced depth in a sense the illusion of a third dimension. When my method is carefully and accurately employed every character, whether it be type, heading, half tone, or line etching, will transfer faithfully.

By my process, artistic reproductions printed in color gravure offer opportunities for richer color effects than are now possible by any other means. These prints become impressionistic facsimile reproductions. They reproduce the realism of the original photograph, they retain their inky attractiveness and yield all the colors. They render effects of light and shade to bring out the necessary accent, or to suggest color or depth of shade.

In the accompanying drawing which forms a part of this specification, Fig. 1 is a diagrammatic sectional view upon an exaggerated scale of a pre-formed, dry, heat-sensitive and pressure-sensitive non-tacky composite film embodying one example of my invention, showing a relatively thick protective film base preferably of translucid cellulose ester material 2 surfaced on one side with a thin, solid, flexible, coextensive, permanently attached, dry, non-tacky skin 1, preferably of fusible thermoplastic synthetic resin.

I prefer to provide a relatively thick film base layer 2 of material which is adapted for winding into a roll and which will not fuse or stick to heated rollers or platens during the welding operation but which will remain substantially permanently attached to the fusible skin 1 both before and after welding.

I prefer to make the non-tacky pre-formed composite film in roll or web form and by coating a conventional translucid film in its normal state. For example, a base layer comprising cellulose acetate (a material readily available at the present time in roll or web form and in thicknesses ranging from 3 to 5 or even 10 one-thousandths of an inch in thickness) may be used; or any equivalent substance which will produce the same result may be employed. Upon one surface of layer 2 is applied the fluid solution comprising thermoplastic synthetic resin to form when dry a relatively thin adherent heat-sensitive and pressure-sensitive non-tacky skin. This skin layer 1, hereinbefore described, is likewise translucent and flexible and will remain substantially permanently attached to the base layer 2 both before and after welding. The dry composite film free from volatile solvent may be wound into a roll for use or for storage without danger of the skin 1 sticking to the uncoated surface of the base layer 2 when the composite film is made in accordance with the hereinabove described method.

One example of a thermoplastic resin adapted for use as a base for the non-tacky skin layer 1 is toluol soluble polymerized vinyl acetate fusible at a temperature below that of the melting point of cellulose acetate. The skin when made with this resin as hereinabove described will not crack, chip, peel or otherwise separate from the base layer under normal conditions of use or storage. The skin layer 1 may be formed from any suitable fluid solution comprising solvent which does not have a dissolving or deleterious action upon the cellulose ester base layer 2, but I prefer however the use of toluol as hereinabove described.

The relative thickness of the layers 1 and 2 can be varied. Layer 2 may be made in any suitable thickness. It may be thinner than 3 or thicker than 10 one-thousandths of an inch as desired to provide the required degree of finish. The relative thickness of the skin 1 can be varied to compensate for the texture of the base material employed in welding, thus insuring against imperfections in the welded composite article and to insure faithful transfer of the ink design as well as for the purpose of developing depth or third dimensional effects, and to assure a solid continuous firm lamina between the base 2 and bonded material after welding.

In the preferred form of my invention the sum total of the thicknesses of the layers 1 and 2 comes within the range of thicknesses of conventional films employed in the useful arts in roll, web and tape form.

The composite film may be welded by the mere application of heat and pressure, for example, by passing a common heated "flat iron" over the uncoated surface of layer 2 with layer 1 in contact with a piece or strip of paper, fabric or other base material. Platen presses may be employed. I prefer however to employ a progressive rolling pressure, said pressure being adjusted at not more than 250 lbs. per square inch to obtain uniform results with thin or thick material, or with fine or close grained materials, and I prefer to employ the heat for welding as hereinabove described.

The composite film shown in Fig. 1 resembles in appearance and feel a conventional film of cellulose acetate and great care must be exercised in contacting the composite film to other material in the welding operation. Should the uncoated surface of layer 2 be inadvertently placed in contact with paper, for example, and then subjected to the influence of heat and pressure, applied by rollers, the skin 1 would adhere to the contacting roller, and no weld would be effected between the film and the paper.

Figure 2:
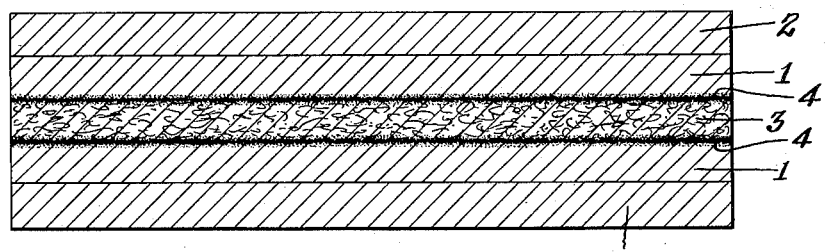

In Fig. 2 there is illustrated a base material 3 bearing an ink design or decoration 4 on both sides thereof. The skin layer 1 is shown intimately bonded to and through the ink design 4 to the base material 3 and to the protective layer 2. The composite film may advantageously be welded to both sides of printed material to protect and finish the same irrespective of whether the material carries an ink design on both sides or not.

Figure 3:
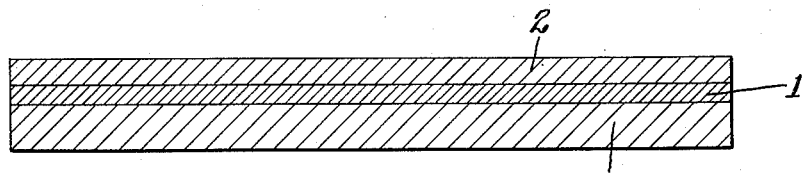

In Fig. 3 there is illustrated a flexible composite structure comprising a flexible base material 3 ornamented and protected or reinforced and finished on one side with the composite film. The relative thickness of the layers are changed. The skin 1 is illustrated as a relatively thin solid continuous firm layer bonding a relatively thin layer 2 to the base material 3.

Flexible base material may be reinforced and stiffened by welding a relatively thick composite film to one side thereof, or flexibility of material may be retained to a very great extent by welding a relatively thin film thereto. Likewise the degree of protection and quality of finish may be varied by adjusting the thickness of the layers according to the result or effect desired. As a matter of economy as well as utility thin composite films may be provided which give surprising effects and decorative finishes, and which, for many purposes, afford satisfactory protective surfaces, particularly when the composite film is applied to printed fibrous material, mechanical prints, and in the manufacture of simulated photographs and the like.

Figure 4:
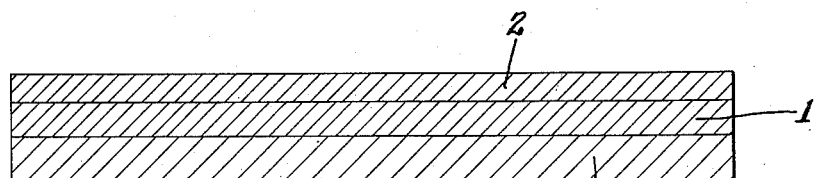

In Fig. 4 there is illustrated a flexible composite structure comprising a flexible base material 3 ornamented, protected and finished on one side with the composite film. The skin 1 is illustrated as a relatively thick layer intimately and firmly bonded to the base 3 and to layer 2. By welding the composite film on both sides of base material the composite structure may be greatly reinforced and stiffened. The composite film being impervious to water, the waterproofing and resistant properties of the structure are very great, and by employing a relatively thick skin 1 the lustre or degree of finish is materially heightened. Because of the character of the substantially permanent and firm weld, which in my preferred forms accompanies transparency, such composite structures are almost unitary articles.

Without further analysis, the foregoing will fully reveal the gist of this invention that others can, by applying current knowledge, readily adapt it for various utilization by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims.

I claim:

1. As an article a pre-formed translucid or transparent heat-and-pressure sensitive composite film adapted for welding to a given base by the application of heat and pressure, said composite film comprising a cellulose acetate film surfaced on one side with a substantially optically indistinguishable relatively thin fusible non-tacky skin of thermo-plastic synthetic resin.

2. As an article a pre-formed translucid or transparent heat-and-pressure sensitive composite film adapted for welding to a given base by the application of heat and pressure, said composite film comprising a cellulose acetate film surfaced on one side with a relatively thin solid continuous fusible non-tacky skin of polymerized vinyl acetate.

3. As an article a preformed translucid or transparent roll of heat-and-pressure sensitive composite film adapted for welding directly from a roll to a given base by the application of regulated heat and regulated pressure, said composite film comprising a heat-resisting translucid film base of cellulose acetate surfaced on one side with a coextensive fusible non-tacky skin of polymerized solid vinyl resin compound, said skin being adapted for transition from a dry non-tacky state into a tacky adhesive state at a temperature below that of the fusing or melting point of said translucid film base.

4. As an article a pre-formed translucid or transparent sheet or roll of composite film adapted for welding without appreciable or observable alteration or chemical change to a given base by the application of heat and pressure momentarily applied, said composite film comprising a film base of cellulose ester surfaced on one side with a coextensive heat-and-pressure sensitive fusible non-tacky skin of thermo-plastic synthetic resin substantially free from volatile solvent.

5. As an article of manufacture a heat-and-pressure sensitive adhesive tape adapted for welding by the action of applied heat and pressure, said adhesive tape comprising a flexible heat-resisting non-tacky cellulose acetate base member supporting an attached coextensive heat-and-pressure sensitive non-tacky fusible adhesive skin of polymerized vinyl ester.

6. As an article of manufacture a heat-and-pressure sensitive adhesive tape adapted for welding by the action of applied heat and pressure, said adhesive tape comprising a flexible heat-resisting non-tacky cellulose derivative base supporting an attached normally inseparable coextensive heat-and-pressure sensitive non-tacky fusible adhesive skin of thermo-plastic synthetic resin.

7. The method of making heat-and-pressure sensitive composite film adapted for welding to a given base comprising applying a coating uniformly to an area of a heat-resisting sheet or film base of cellulose acetate, said coating comprising a filtered solution of fusible thermo-plastic synthetic resin in a solvent volatile at a temperature below the melting point of said resin and said cellulose acetate and which will not have solvent action upon said cellulose acetate at normal pressures and temperatures, evaporating volatile solvent to deposit the thermoplastic resin in the form of a fusible, non-tacky, solid skin, and then winding the film so produced into a roll.

8. The method of making heat-and-pressure sensitive composite film adapted for welding interchangeably by platens or rollers comprising applying a coating uniformly to an area of a sheet or film base of cellulose ester, said coating comprising a filtered solution of polymerized vinyl acetate resin in volatile solvent, exposing the coated film base to an atmosphere the temperature of which is below the melting point of said resin and said cellulose ester to evaporate said solvent and thereby form an optically indistinguishable flexible, adherent, heat-and-pressure sensitive, non-tacky, solid skin.

9. The method of making composite film adapted for welding by the action of applied heat and pressure comprising applying a coating uniformly to an area of a relatively thick sheet or film base of cellulosic derivative, said coating comprising fusible thermo-plastic synthetic resin in suitable volatile solvent, substantially completely evaporating volatile solvent, thereby forming a relatively thin, flexible, adherent, heat-and-pressure sensitive, non-tacky, solid resinous skin which will not crack, chip, peel or otherwise separate from the film base.

10. In a method of producing a substantially unitary article by welding heat-and-pressure sensitive composite film comprising a base member of cellulose acetate surfaced on one side with a solid coextensive skin of thermoplastic synthetic resin to the surface of a given base material by the action of applied heat and pressure, steps comprising applying the composite film to the surface of a base member, subjecting said composite film and said base member to the action of regulated heat at a temperature below that of the melting point of said cellulose acetate and to the action of regulated pressure of not substantially more than 250 lbs. per square inch, applying said heat to and through said base member, rendering said skin of resin plastic and adhesive to thereby weld said composite film to said base member by fusion under the action of said pressure to form an apparent integral article which is normally inseparable by ordinary means, said heat and pressure being applied by any suitable means.

11. In a method of producing a substantially unitary article by welding heat-and-pressure sensitive composite film comprising a base member of cellulose ester surfaced on one side with a solid coextensive skin of polymerized vinyl ester resin to the surface of a given base material by the action of heat and pressure, steps comprising applying the composite film to the surface of a base member, subjecting said composite film and said base member to the action of regulated heat at a temperature below that of the melting point of said cellulose ester and to the action of regulated pressure of not substantially more than 250 lbs. per square inch, applying said heat to and through said base member, rendering said skin of resin plastic and adhesive to thereby weld said composite film to said base member by fusion under the action of said pressure to form an apparent integral article having a solid continuous firmly bonded normally inseparable resinous layer in intermediate relation to said cellulose ester and said base member, said heat and pressure being applied by any suitable means.

12. A composite structure having all or part of one or both sides ornamentel, protected or finished, said structure comprising a base member surfaced or partly surfaced on one or both sides with a translucid or transparent heat-and-pressure sensitive composite film, said composite film comprising a cellulose acetate film base surfaced on one side with a coextensive substantially optically indistinguishable, solid, continuous, fusible skin of thermoplastic synthetic resin, said skin intervening between said base member and said film base and bonding the film base to the base member, said base member and said film base being firmly and substantially permanently bonded and normally inseparable by ordinary means substantially as described.

13. A composite structure having all or part of one or both sides ornamented, protected or finished, said structure comprising a base member surfaced or partly surfaced on one or both sides with a translucid or transparent heat-and-pressure sensitive composite film, said composite film comprising a cellulose ester film base surfaced on one side with a coextensive fusible skin of polymerized vinyl ester resin, said skin intervening between said base member and said film base and bonding the film base to the base member, said base member and said film base being firmly and substantially permanently bonded and normally inseparable by ordinary means substantially as described.

CLYDE SCOTT.